(No Model.)
R. S. CRAWFORD & C. H. CARLILE.
BALL BEARING AXLE BOX.
No. 538,012. Patented Apr. 23, 1895.
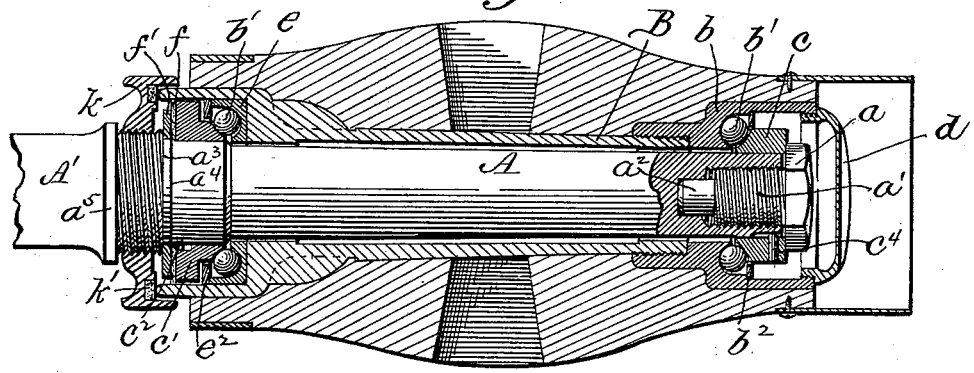
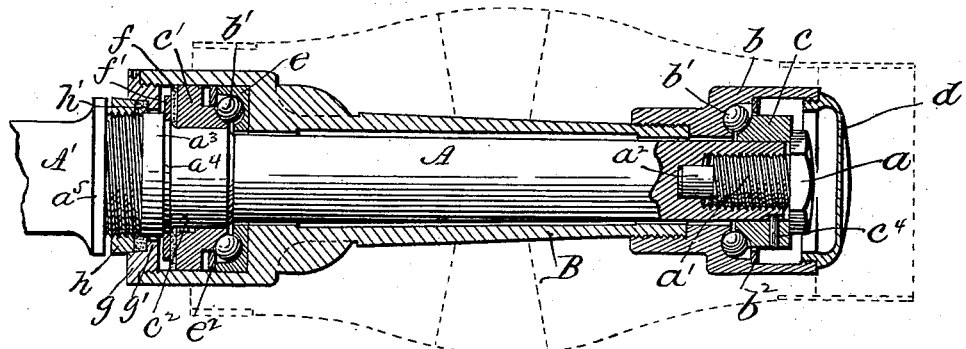
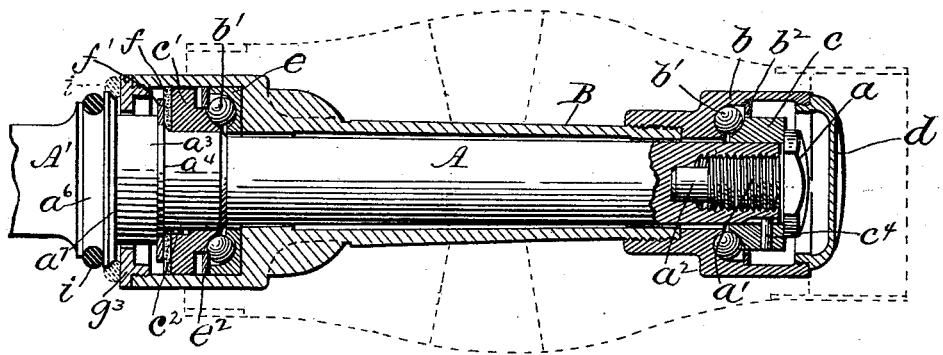
Witnesses:
C. M. Sweeney
Geo. B. Whiting
Inventors:
R. S. Crawford & C. H. Carlile
by Henry Baler
Attorney.

UNITED STATES PATENT OFFICE.

ROBERT S. CRAWFORD AND CHARLES H. CARLILE, OF HAGERSTOWN, MARYLAND.

BALL-BEARING AXLE-BOX.

SPECIFICATION forming part of Letters Patent No. 538,012, dated April 23, 1895.

Application filed February 13, 1895. Serial No. 538,271. (No model.)

*To all whom it may concern:*

Be it known that we, ROBERT S. CRAWFORD and CHARLES H. CARLILE, citizens of the United States, residing at Hagerstown, in the county of Washington and State of Maryland, have invented certain new and useful Improvements in Ball-Bearing Axle-Boxes, of which the following is a specification, reference being had therein to the accompanying drawings.

In the use of ball bearings for carriage axles it is desirable that said bearings should not only be dust-proof but water-proof, for the reason that water, which may be forced into the bearings under pressure when the carriages are being washed, is liable to cause the balls to rust in their bearings and thus become stuck fast so that the bearings will not operate properly.

Our invention has for its object to provide a dust-proof and water-proof ball-bearing axle-box for carriages, of simple construction, while at the same time there will be no objectionable friction between the stationary axle and the parts moving with the box.

In carrying our invention into effect the axle-box, which is to be fitted within a wheel hub, is provided at its outer end with a ball-bearing tightly closed by a screw-cap, while at its inner end it has a ball-bearing suitably inclosed and protected from dust by a washer or washers of felt or other yielding material.

In addition to the dust-excluding washer or washers just referred to we provide at the inner end of our improved axle-box a movable device which is normally (or when the carriage is running) in an idle position but which is adapted to be changed to an operative position when the carriage is to be washed, to form an absolutely water-proof joint at the inner end of the axle box, so that even if water be forced against the axle-box under pressure it cannot get into the ball-bearings.

In the accompanying drawings, Figure 1 is a sectional view illustrating the preferred form of our invention, and Figs. 2 and 3 show slightly modified forms thereof.

In the drawings A denotes the axle spindle, and A' a portion of the axle.

B is a sleeve loosely surrounding the axle spindle and provided at its outer end with a cup $b$ screwed to the said sleeve and in which cup the balls $b'$ are retained by a ring $b^2$ fitting tightly in the bore of the cup. Closely fitted onto the outer end of the axle spindle, but not screwed thereto, is a cone $c$ between which and a suitable race-way in the cup $b$ the balls $b'$ are placed. The cone $c$ is held in place by a head $a$ of a cap-screw $a'$, said screw having a reduced part or nib $a^2$ which abuts against the bottom of a suitable recess at the inner end of the hole into which the screw $a'$ is tapped, when the head of the said screw is in such position as to hold the cone $c$ in proper adjustment. When it is desired to take up wear the screw $a'$ may be removed, and the end of the nib $a^2$ filed off slightly in order that the screw may be turned a little farther in; or the hole or recess may be deepened slightly for this purpose. The cone $c$ is held from turning by a pin $c^4$ which engages a groove in the axle-spindle, so that said cone can move slightly lengthwise of the said spindle when adjusted to take up wear. The cup $b$ is closed at its outer end by a cap $d$ which is screwed to the end of the said cup and which therefore makes an entirely dust-proof and water-proof housing for the outer end of the axle-box.

The enlarged inner end of the sleeve B is provided interiorly with a ring $e$ suitably recessed for the reception of the balls $b'$ which are held in said ring by a metal washer or ring $e^2$ tightly fitting the bore of the enlarged inner part of the said sleeve.

The axle spindle A is provided with a cone $c'$ closely fitted thereon, and secured thereto, so as to be held from turning, by a pin $c^2$; or this might be effected be a suitable splined connection of the said cone with the axle spindle. Between shoulders formed by flanges $a^3$, $a^4$, on the axle-spindle and the cone $c'$ are interposed a washer $f$ of felt or other suitable elastic material and a ring or washer $f'$ of metal, the latter abutting against the shoulder formed by the said flange $a^3$.

In the preferred form of our invention shown in Fig. 1 the axle spindle is threaded to receive a nut $k$ which is recessed on its inner face for the reception of a ring $k'$ of leather or similar packing material which, when the carriage is to be washed, will, by screwing up the nut $k$, as shown, be forced tightly against the inner end of the sleeve B and thus make an absolutely water-proof joint, and when the carriage is to run the nut $k$ will be screwed back against the flange $a^5$ on the axle.

In the form of our invention shown in Fig. 2 a metal ring $g$ is screwed into the enlarged inner end of the sleeve B, said ring being provided with an inwardly projecting flange $g'$ between which and a nut $h$, screwed into the axle spindle, is interposed a washer $h'$ of felt or other suitable elastic material. The adjacent faces of the nut $h$ and ring $g$ are preferably tapered, so that the former may fit within the latter when screwed up to compress the washer $h'$, as shown in Fig. 2. The axle is provided with a flange $a^5$ against which the nut $h$ is screwed when the vehicle is running, but when it is desired to compress the elastic washer $h'$, so as to make it tightly embrace the axle spindle, and thus make a water-proof joint, the nut $h$ is screwed up as shown in the drawings.

In the modified form of our invention shown in Fig. 3 the ring $g^3$ which is screwed into the enlarged inner end of the sleeve B is of slightly different form than the ring $g$ shown in Fig. 2, and in this modified form of our invention, to furnish a water-excluding device which may be shifted into operative position when the carriage is to be washed, we provide a rubber ring $i$ which is normally carried in a grooved flanged portion $a^6$ of the carriage axle, but which may be shifted in contact with the ring $g^3$ and into the grooved portion $a^7$ of the axle when it is desired to make the inner end of the axle box absolutely water-proof. When the ring $i$ is thus shifted into its water-excluding position it will preferably have more tension than when it is in its idle position, this being effected by making the grooved part $a^6$ of smaller diameter than the part $a^7$, and said ring $i$, when shifted, will thus tightly hug against the ring $g^3$ and the bearing $a^7$ on the axle, so as to make a tight water-proof joint.

It will thus be seen that we provide a carriage axle-box which in its normal working position is practically dust and water-proof, and which, by the shifting of a part preferably carried by the axle, may be made absolutely water-proof when the carriage is to be washed; so that no matter what the pressure of the water forced against the hubs of the wheels in washing may be no particles of the water can be forced into the ball bearings of the axle-box. This result, it will be observed, is effected, in the several forms of our invention herein shown, by a movable part which occupies what may be termed an idle position when the carriage is running, and which is adjusted into its operative position at the time when the carriage is to be washed and when it is particularly necessary to make the ball-bearings absolutely water-proof.

Having thus described our invention, we claim and desire to secure by Letters Patent—

1. The combination with an axle, of an axle-box provided with ball-bearings at or near its opposite ends, and a movable water-excluding device at the inner end of the axle-box to be normally carried in an idle position but adapted to be shifted into an operative position, to form an absolutely water-proof joint at the inner end of the axle-box when the carriage wheels are to be washed.

2. The combination with an axle spindle, of a sleeve surrounding the same, a cup secured to the outer end of said sleeve and provided with a suitable recess, balls in said recess to form a ball bearing, a cone having a sliding fit on the outer end of said axle-spindle, and between which and the said cup said balls are held, and a cap-screw tapped into the outer end of the said axle-spindle and having a head of suitable size to abut against the said cone, and having also a nib or portion which abuts against the bottom of a recess formed in the outer end of the said axle spindle, and a cap closing the outer end of said cup.

3. The combination with an axle spindle, of a sleeve surrounding the same, cones on said spindle, balls interposed between said sleeve and cones, an adjustable nut which is independent of either of said cones and which is mounted at the inner end of said sleeve, and a packing ring co-operating with said nut so that when the latter is screwed toward said sleeve there will be an absolutely water-tight joint at the inner end of the axle-box.

4. The combination with an axle-spindle, of a sleeve surrounding the same, cones on said spindle, balls interposed between said sleeve and cones, an adjustable nut which is independent of either of said cones and which is mounted at the inner end of said sleeve, and a packing ring carried in the outer face of said nut and serving, when the said nut is screwed toward the inner end of the said sleeve, to abut against the said inner end and thus form an absolutely water-proof joint at the inner end of the said axle-box.

5. A carriage-axle ball-bearing comprising the axle provided with the flange $a^5$, the sleeve B having an enlarged inner end and provided at its outer end with a cup $b$ screwed to said sleeve, the cone $c$ having a sliding fit on the outer end of the said axle spindle, balls interposed between said cone and a suitable recess in said cup, the cap $d$ screwed into the outer end of said cup, the cap-screw $a'$ having a head abutting against said cone, the cone $c'$ fitted into the said axle spindle toward the inner end of said sleeve, the ring $e$ fitted into the enlarged inner end of said sleeve, balls interposed between said ring and said cone $c'$, washers $f$ and $f'$ interposed between the end of said cone and suitable shoulders on said axle-spindle, the nut $k$ mounted in a threaded part of said axle and provided with the packing ring $k'$, said nut being adapted to be slackened backward against the said flange $a^5$ when the carriage is running, or to be screwed against the inner end of said sleeve to form a water-tight joint when the carriage is to be washed.

In testimony whereof we affix our signatures in presence of two witnesses.

ROBERT S. CRAWFORD.
CHARLES H. CARLILE.

Witnesses:
A. YINGLING,
C. T. McCUE.